(12) United States Patent
Chokshi et al.

(10) Patent No.: US 10,472,946 B2
(45) Date of Patent: Nov. 12, 2019

(54) SMARTER SLUG FLOW CONDITIONING AND CONTROL

(71) Applicant: Weatherford Technology Holdings, LLC, Houston, TX (US)

(72) Inventors: Rajan N. Chokshi, Houston, TX (US); Luis E. Gonzales, Houston, TX (US); William C. Lane, The Woodlands, TX (US); David A. Joy, Willis, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 718 days.

(21) Appl. No.: 14/856,936

(22) Filed: Sep. 17, 2015

(65) Prior Publication Data
US 2016/0084063 A1    Mar. 24, 2016

Related U.S. Application Data

(60) Provisional application No. 62/054,179, filed on Sep. 23, 2014.

(51) Int. Cl.
| | | |
|---|---|---|
| *E21B 47/00* | (2012.01) | |
| *E21B 34/16* | (2006.01) | |
| *E21B 43/12* | (2006.01) | |
| *G05B 19/416* | (2006.01) | |

(52) U.S. Cl.
CPC .............. *E21B 47/00* (2013.01); *E21B 34/16* (2013.01); *E21B 43/12* (2013.01); *E21B 43/121* (2013.01); *E21B 43/128* (2013.01); *E21B 47/0007* (2013.01); *G05B 19/416* (2013.01); *G05B 2219/49056* (2013.01)

(58) Field of Classification Search
CPC ........ G05B 19/416; G05B 2219/49056; E21B 34/16; E21B 47/00; E21B 43/12; E21B 43/128; E21B 43/121; E21B 47/0007

USPC ............ 700/282; 166/372, 105, 68; 210/739
See application file for complete search history.

(56) References Cited

U.S. PATENT DOCUMENTS

| | | | | |
|---|---|---|---|---|
| 2002/0029883 | A1* | 3/2002 | Vinegar | E21B 17/003 166/250.15 |
| 2004/0245182 | A1* | 12/2004 | Appleford | E21B 43/121 210/739 |
| 2006/0081378 | A1* | 4/2006 | Howard | E21B 43/12 166/372 |
| 2010/0288506 | A1 | 11/2010 | Lemetayer | |
| 2016/0218104 | A1* | 7/2016 | Wen | H01L 21/845 |

FOREIGN PATENT DOCUMENTS

| | | |
|---|---|---|
| WO | 2008140319 A1 | 11/2008 |
| WO | 2012087430 A1 | 6/2012 |

OTHER PUBLICATIONS

International Search Report dated Feb. 12, 2016, corresponding to Application No. PCT/US2015/050682.

* cited by examiner

*Primary Examiner* — Bo Fan
(74) *Attorney, Agent, or Firm* — Patterson + Sheridan, LLP

(57) ABSTRACT

Aspects of the present disclosure generally relate to attenuating the effects of slugging based on one or more measurements of parameters from one or more locations in one or more wells. In some cases, a controller may be configured to attenuate the effects of slugging based on the one or more parameters, for example, by controlling a choke or an artificial lift. In certain aspects, the one or more locations may include downhole or at the surface of the one or more wells.

32 Claims, 11 Drawing Sheets

SMARTER SLUG FLOW CONDITIONING AND CONTROL

CROSS-REFERENCE TO RELATED APPLICATIONS

The present application claims priority to provisional U.S. Application Ser. No. 62/054,179, entitled "SMARTER SLUG FLOW CONDITIONING AND CONTROL," filed Sep. 23, 2014, which is assigned to the assignee of the present application and hereby expressly incorporated by reference herein in its entirety.

BACKGROUND OF THE INVENTION

Field of the Invention

Aspects of the present disclosure generally relate to mitigating the effect of slugging in a well.

Description of the Related Art

Horizontal well completions are increasingly common in unconventional and tight developments. The wells are deep and typically have long laterals (true vertical depth (TVD) from 5000 to 10,000 feet and laterals from 3,000 to 10,000 feet and higher). A common occurrence in such wells is the presence of "slugs" in the flow, which generally refers to a relatively high concentration of liquid followed by periods of relatively high concentrations of gas flow.

Non-homogeneity of a reservoir, multi-stage completion practices, and lateral geometries can all promote significant slugging activities in such wells. Slugging may also occur in conventional wells and gas-lifted wells, as well as deep-sea production wells, where riser induced slugging is often observed.

SUMMARY OF THE INVENTION

Certain aspects of the present disclosure provide techniques for managing slugs in a fluid flow produced from at least one wellbore. The techniques generally include sensing at least a first parameter of the fluid flow downhole in the wellbore, and taking one or more actions to manage the fluid flow if the first parameter indicates presence of a slug of gas or liquid in the fluid flow.

Certain aspects of the present disclosure provide an apparatus for managing slugs in a fluid flow produced from at least one wellbore. The apparatus generally includes a processing system configured to sense at least a first parameter of the fluid flow downhole in the wellbore, and take one or more actions to manage the fluid flow if the first parameter indicates presence of a slug of gas or liquid in the fluid flow.

Certain aspects of the present disclosure provide a computer readable medium comprising instructions for managing slugs in a fluid flow produced from at least one wellbore, wherein the instructions, when executed, cause an apparatus to sense at least a first parameter of the fluid flow downhole in the wellbore, and take one or more actions to manage the fluid flow if the first parameter indicates presence of a slug of gas or liquid in the fluid flow.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Aspects of the present disclosure provide techniques that may help manage or mitigate the effects of slugging in a flow from a wellbore or group of wellbores. In some cases, measurements may be taken downhole of a wellbore, and in some cases at the surface of the wellbore, to detect presence (or likelihood) of a slug in the flow. In response to this detection, action may be taken to manage the slug. For example, a choke device at the surface of the wellbore may be controlled to reduce adverse effects of the slug. In some cases, actions may be taken in an effort to control formation of the slug downhole (e.g., by controlling a downhole choke or adjusting some type of artificial lift mechanism).

Figure 1:
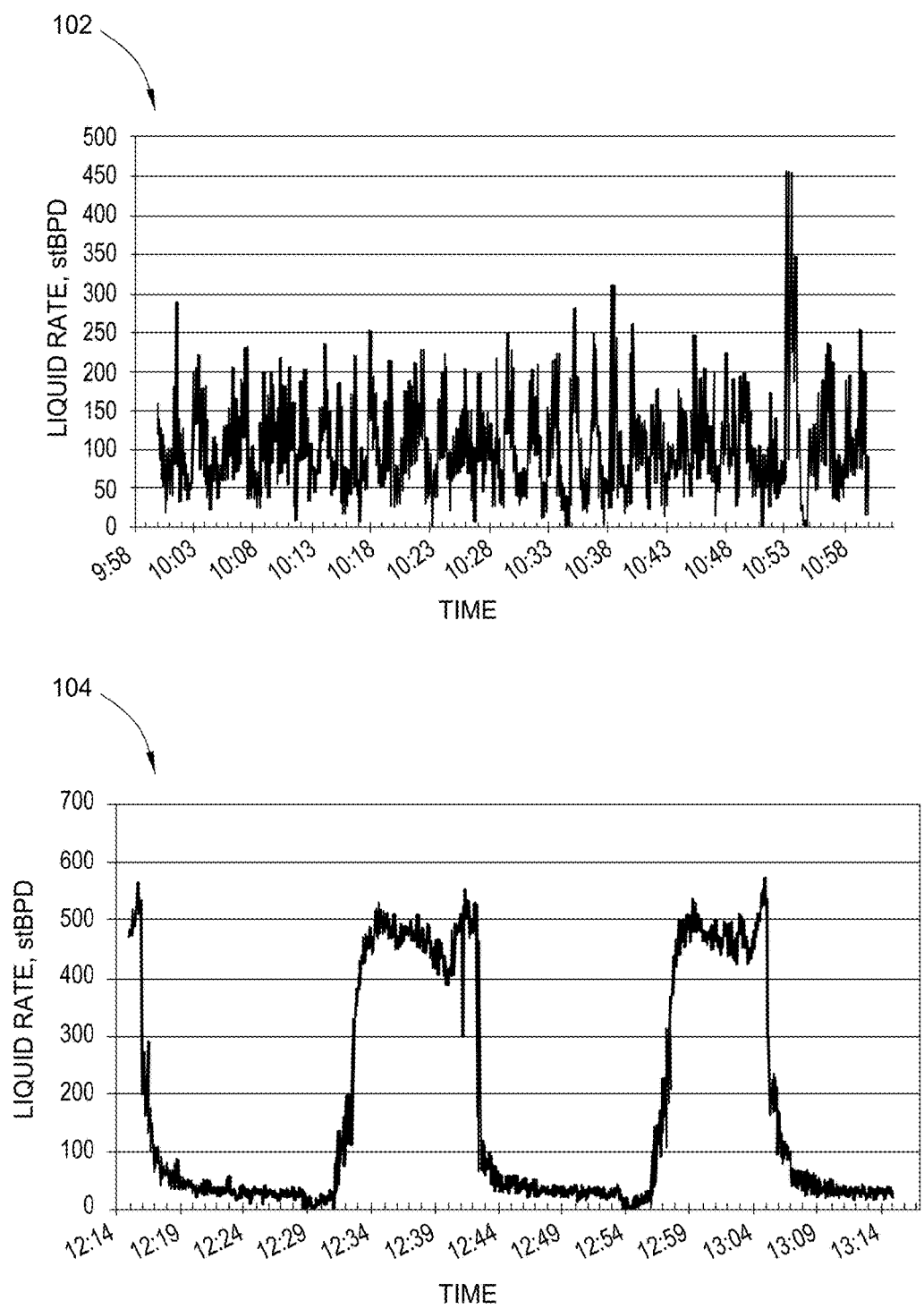
FIG. 1 illustrates variations in liquid flow rate measurements indicative of slug flow.

FIG. 1 shows example flow rate measurements for two wells and demonstrates the rapid changes in flow rate and pressure that occurs over a period of time that illustrate the effects of slugging in a production flow. For example, as illustrated in graph 102, variations in liquid flow rate may be observed ranging from 0 to 450 stBPD (stock tank Barrel Per Day). In addition, as illustrated in graph 104, periods of time may be observed where the liquid flow rate may be low, e.g., ranging from 0-100 stBPD, followed by periods of time where an increased flow rate is observed, e.g., ranging from 400-600 stBPD.

As mentioned above, the fluctuating nature of slug flow is typically caused by long gas bubbles alternating with liquid slugs. This causes significant pressure and flow rate swings at the surface. As a result of these fluctuations, problems may arise with surface equipment such as, for example, separator upset, excessive surface alarming and similar problems leading to avoidable non-productive time (NPT).

Slug flow also may cause significant problems for downhole lift systems (e.g., artificial lifts). With the exceptions of gas lift, plunger lift, and foam lift, most other lift systems perform poorly in the presence of gas. The problems become worse when gas is present in slugs. Separation of gas may be challenging because long gas slugs are difficult to separate and natural gravity separation becomes more difficult as wellbore trajectories approach horizontal.

According to certain aspects presented herein, slug flow may be managed (e.g., by managing a choke) based on sensor measurements of certain flow parameters which may help mitigate many operational issues caused by slug flow as presented above. The techniques presented herein may be used with unconventional wells, which may be choked to maximize estimated ultimate recovery (EUR) by avoiding possible formation damage from excessive pressure drawdown. For example, a geomechanical reservoir model based on permeability decay indicates that proper choke management can improve EUR significantly (e.g., by more than 25%). In addition, choking an unconventional well may help improve flow stability potentially leading to improved EUR in the intermediate and later stages of the life of the well. Choking the well may reduce the decline rate which can postpone the need for artificial lift and allows for a broader selection of lift technologies once lift is used. Increased back pressure from chokes can also reduce gas volume thereby improving the pumping efficiency of mechanical artificial lift systems.

Figure 2:
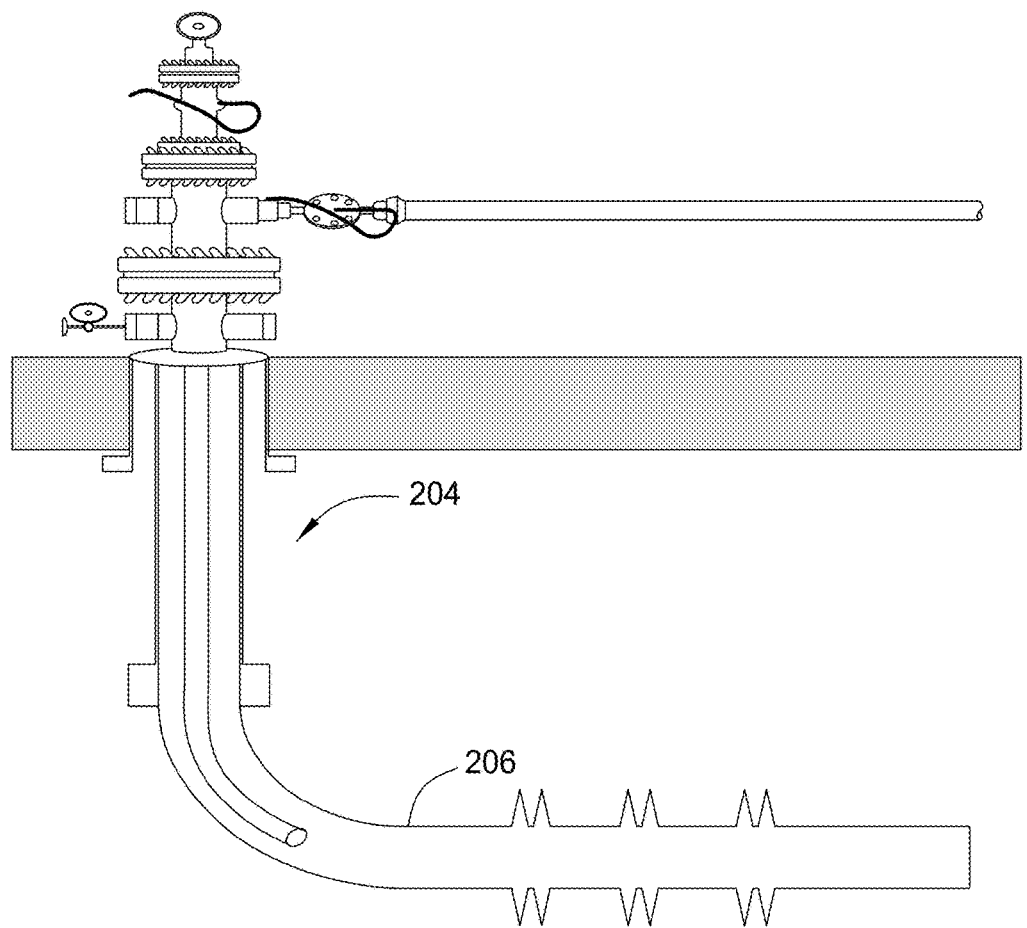
FIG. 2 illustrates an example well configuration, in which certain aspects of the present disclosure may be practiced.

FIG. 2 illustrates well configuration without any control or monitoring of slug formation (e.g., that does not utilize slug mitigation techniques presented herein). As illustrated, the well comprises a well bore 204 having a horizontal conduit flow line 206. As described above, slugging may form inside the wellbore and cause multiple complications at the surface.

Managing the Effects of Slugging

Certain aspects of the present disclosure, however, may help manage (or attenuate) the effects of slug flow in one or more such wells based on measurements of parameters inside a well bore (downhole) and/or at the surface.

Figure 3:
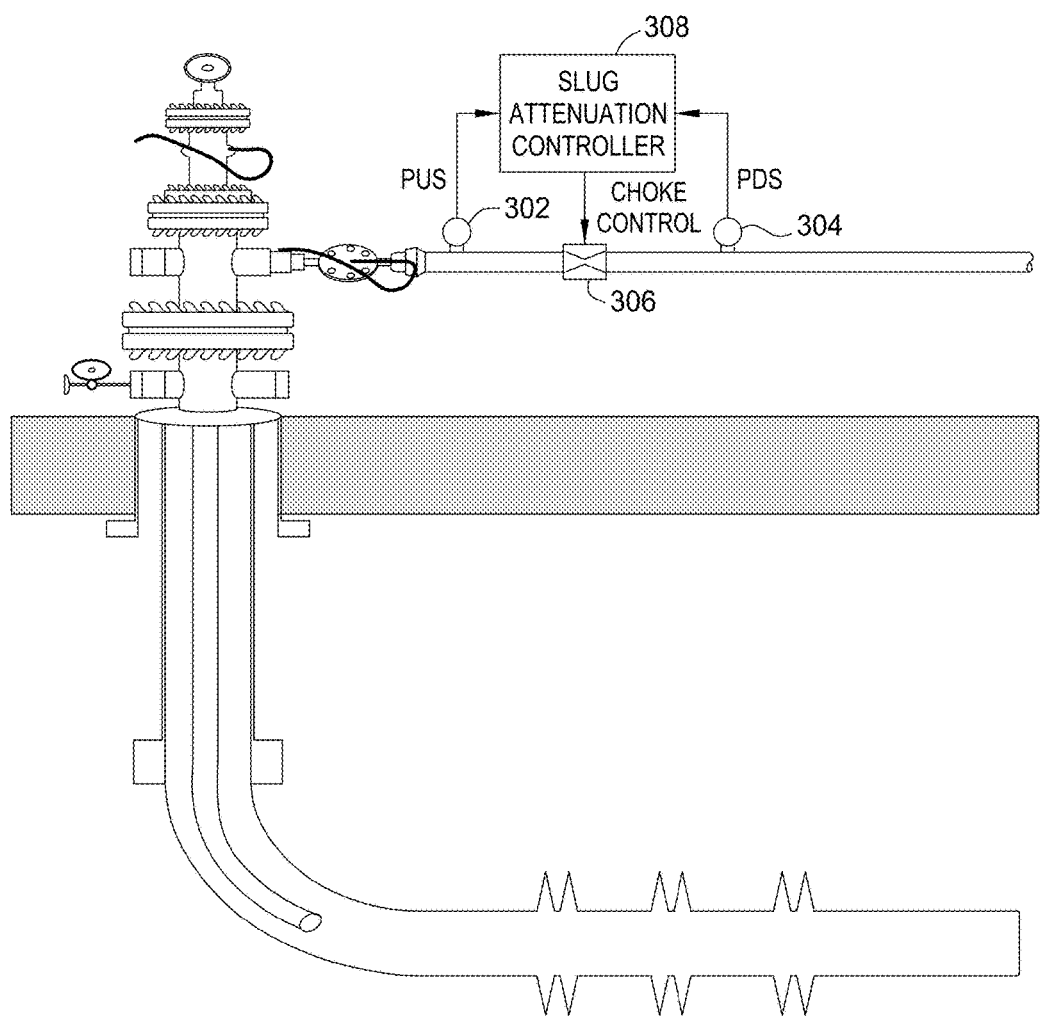
FIG. 3 illustrates the example well configuration with choke control based on surface measurements.

For example, FIG. 3 illustrates a well configuration having a first sensor 302 located upstream from a choke 306, and a second sensor 304 located downstream from the choke 306. Upstream and downstream are relative to a direction of the fluid flow in the well. The sensors 302, 304 (or sensor 512 presented in FIG. 5) represent sensors or sensor arrays that sense one or more parameters characterizing single or multiphase flow behavior. Examples of such parameters include, but are not limited to pressure, differential pressure, temperature, flow rate, or even individual phase components of the fluid flow A controller 308 (e.g., located at the surface of the wellbore) may be configured to detect the presence (or likelihood) of slugging, based on measurements from the sensors 302 and 304. In response to detecting slugging, the controller 308 may control a variable choke 306 in an effort to mitigate adverse effects of the slugging. In some cases, the controller 308 may also communicate the parameters or the information regarding slugging with, for example, a supervisory control and data acquisition (SCADA) system, a distributed control system (DCS), or other surveillance system through an appropriate communication layer.

Figure 4:
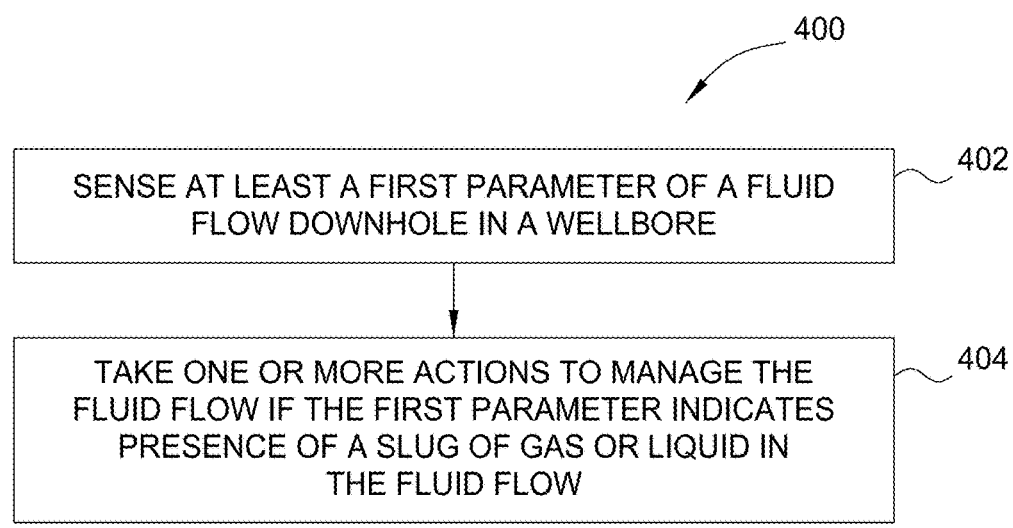
FIG. 4 illustrates example operations for managing the effects of slug flow, in accordance with certain aspects of the present disclosure.

In some cases, downhole measurements may also be used to detect or predict the occurrence of slugging in the flow. FIG. 4 illustrates example operations 400 for managing slugs in a fluid flow produced from at least one wellbore based on downhole measurements, in accordance with aspects of the present disclosure. The operations 400 may be performed by a control device, such as controller 308, which may be implemented as a proportional-integral-derivative (PID) controller or any other suitable type of controller.

The operations 400 begin, at 402, by sensing at least a first parameter of the fluid flow downhole in the wellbore. As will be described in greater detail below, the first parameter may be sensed upstream of a device configured to manage fluid flow such as a choke. In certain aspects, sensing the first parameter may involve sensing a sonic signature or a multi-phase meter feedback. For example, downhole flow meters may be used to accurately identify slug formation in the wellbore. In some cases, sensing the first parameter may involve sensing amperage or rotations per minute (RPM) fluctuations of a lift system for the wellbore, which may also be used to indicate slugs in the fluid flow.

At 404, the control device takes one or more actions to manage the fluid flow if the first parameter indicate the presence of a slug of gas or liquid in the fluid flow. The actions may vary, for example, including control of a surface and/or downhole choke or adjusting artificial lift conditions. In certain aspects, the sensing at 402 may include sensing a second parameter of the fluid flow at a surface of the wellbore (e.g., sensed downstream of the surface choke device). In this case, the control device may take one or more actions to manage the fluid flow if the first and second parameters indicate the presence of the slug of gas or liquid in the fluid flow.

Figure 5:
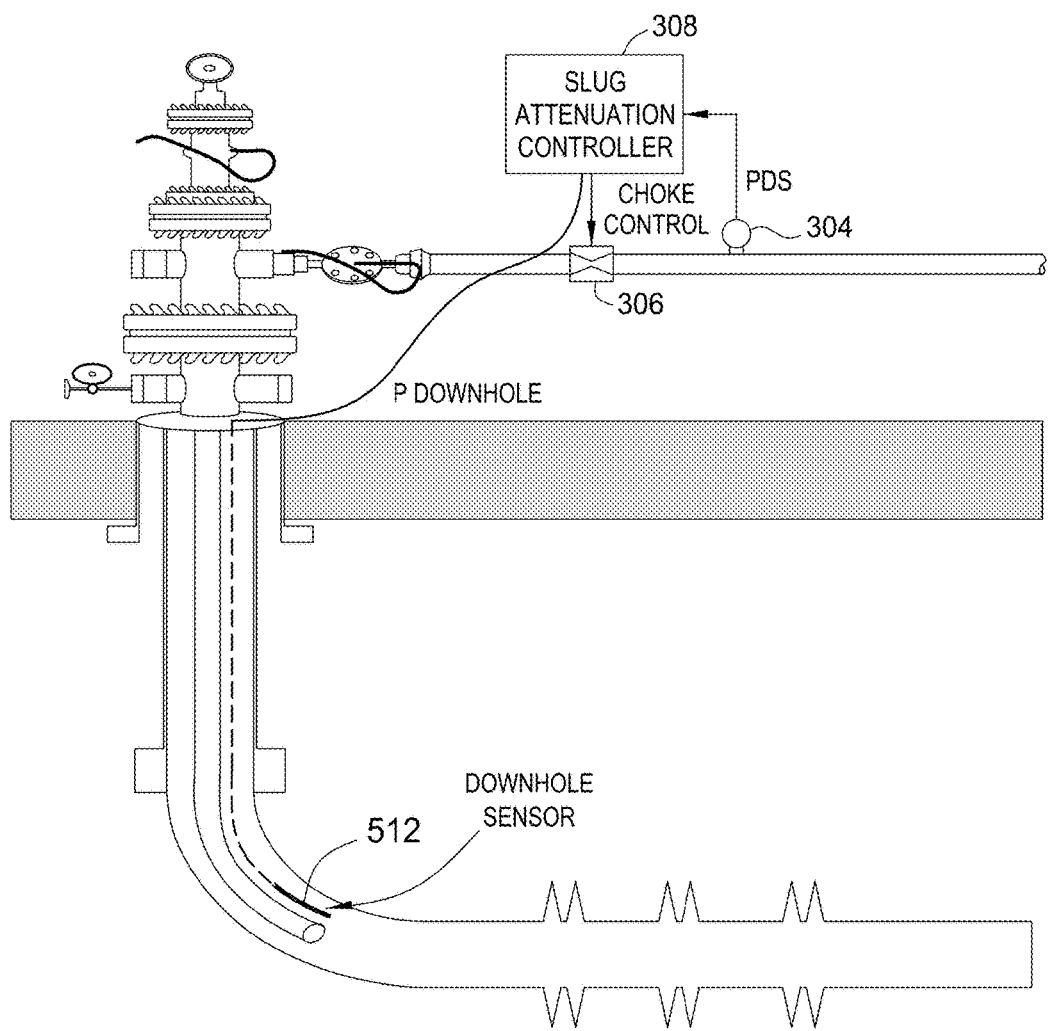
FIG. 5 illustrates an example well configuration with choke control based on surface and downhole measurements, in accordance with certain aspects of the present disclosure.

FIG. 5 illustrates an example of a system having a controller 308 that may be configured to perform the operations of FIG. 4. As illustrated, controller 308 receives a first parameter from an upstream sensor 512 that is downhole. Based on the received parameter, the controller manages the effects of identified slugs by controlling a choke 306 at the surface. In certain aspects, the controller 308 may also receive a second parameter from a downstream sensor 304 at the surface. In this case, the controller manages the effects of identified slugs by controlling a choke 306 at the surface based on the both the first and second parameters received from respective sensors 512 and 304.

As illustrated, the sensor 512 may be located inside the wellbore (downhole) closer to the heel of the horizontal conduit. Accordingly, the controller may receive input parameters, not only from sensors at the surface (e.g., sensor 304) of the well, but also from sensors downhole inside the wellbore (e.g., sensor 512). Based on downhole input parameters, the controller 308 may be able to more effectively determine information about slug flow inside the well and attenuate the effects of slugging by, for example, controlling a choke 306 at the surface or diverting the fluid flow to an alternate flow path. For example, with the availability of measurements such as a flow rate of slugs inside the wellbore, the controller 308 can determine a time at which the slug may reach equipment at the surface. With this information, the controller 308 can more effectively manage the effects of slugging by controlling the opening of the choke 306. In some cases, a controller may manage slug flow based on at least a first downhole parameter and at least a second downhole parameter (e.g., measured upstream and downstream of a downhole choke or other type of downhole device).

Figure 6:
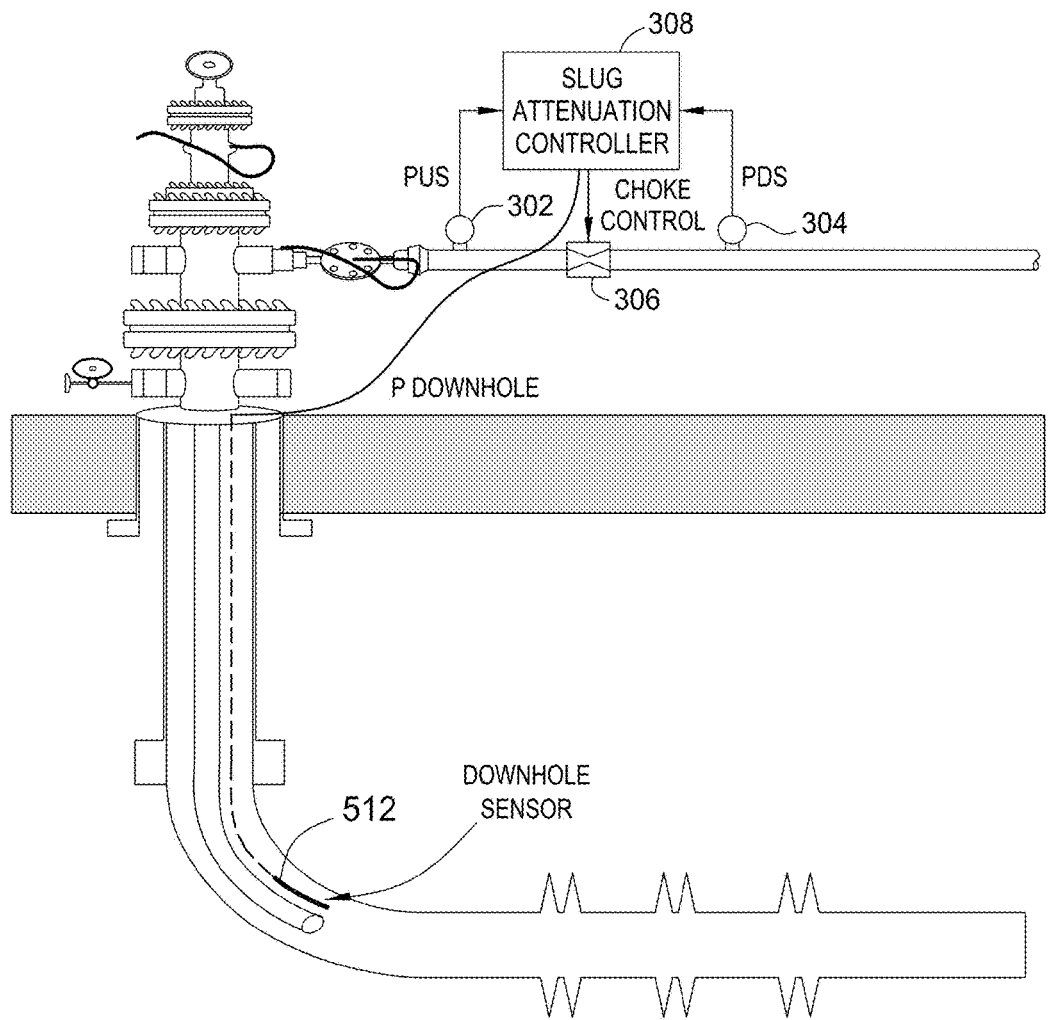
FIG. 6 illustrates an example well configuration with choke control based on downstream measurements at the surface and up-stream measurements both at the surface and inside the wellbore, in accordance with certain aspects of the present disclosure.

Certain aspects of the present disclosure may combine the features presented above in FIG. 3 and FIG. 5. For example, as illustrated in FIG. 6, the controller 308 may manage the effects of slugging by controlling the choke 306 based on downstream measurements at the surface (sensor 304) and up-stream measurements both at the surface (sensor 302) and inside the wellbore (sensor 512).

As noted above, in some cases, artificial lift may be controlled as part of an effort to mitigate the effects of slugging.

Figure 7:
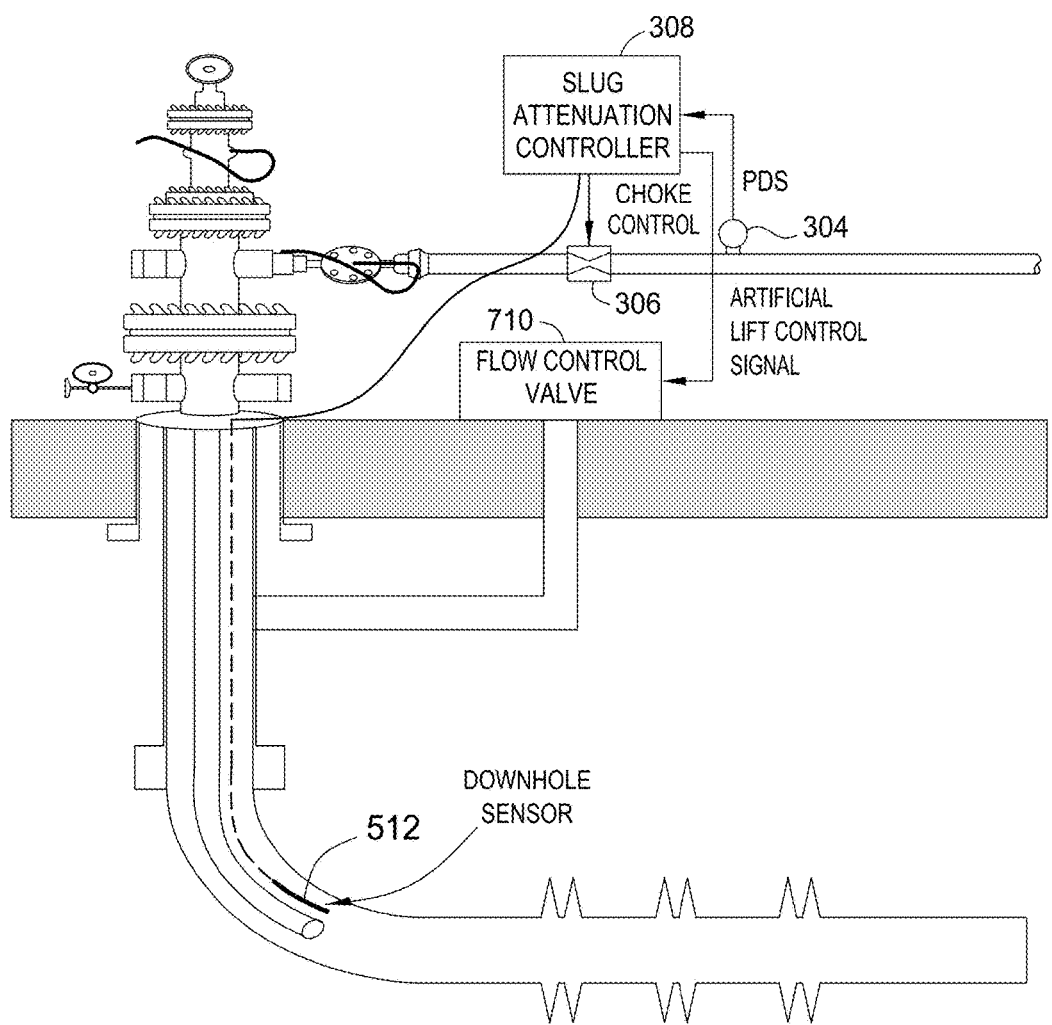
FIG. 7 illustrates an example well configuration with choke control and a gas lift control based on surface and downhole measurements, in accordance with certain aspects of the present disclosure.
Figure 8:
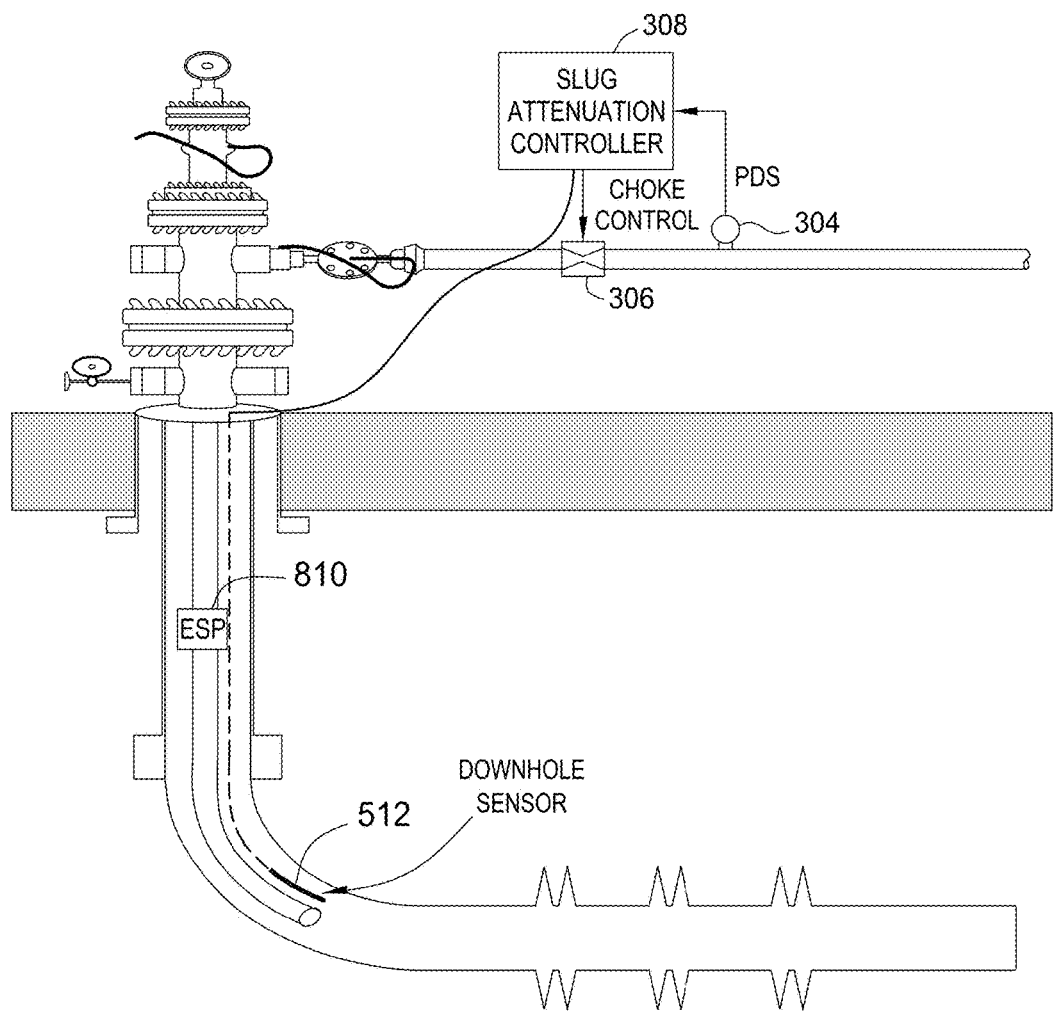
FIG. 8 illustrates an example well configuration with control of a choke and an electrical submersible pump (ESP) based on surface and downhole measurements, in accordance with certain aspects of the present disclosure.

For example, as illustrated in FIG. 7, the controller 308 may adjust a gas flow control valve 710 based on parameters received from sensor 304 and 512 to control artificial lift in an effort to manage slug flow. By controlling the flow control valve 710, the controller 308 can, for example, adjust the flow rates inside the well and control the time at which slug flow may reach equipment at the surface (e.g., a header). Similarly, in some cases, the controller 308 may control artificial lift by controlling an electrically submersible pump (ESP) 810, as illustrated in FIG. 8, or a Progressing Cavity Pump (PCP). Other suitable methods of controlling artificial lift may also be adjusted in an effort to mitigate the effects of slugging, such as controlling a pump rate in a sucker rod pump system. In some cases, gas-lift slug attenuation may also be implemented by injecting alternate quantities of gas.

Due to the varying characteristics of various wells, an algorithm for choke control as presented herein may become more than just a trivial example of PID control. When the control variable or parameters (e.g., liquid and/or gas production) exhibits wide and erratic swings, the controller may frequently tune the control algorithm in order to compensate for this behavior. In some cases, a typical PID control may not suffice and a more heuristically governed approach may be taken. For example, a modified PID control having a sampling time interval may be introduced into the traditional control algorithm. The intended effect may be to allow sufficient time to provide averaged values for feedback in an attempt to minimize typical overshoot or undershoot of the control algorithm. The time interval may be configurable on a case-by-case basis. Additional process control techniques may also be used by the controller, such as time/frequency domain transformations (e.g., Fourier Transform) similar to noise cancelling devices.

Figure 9:
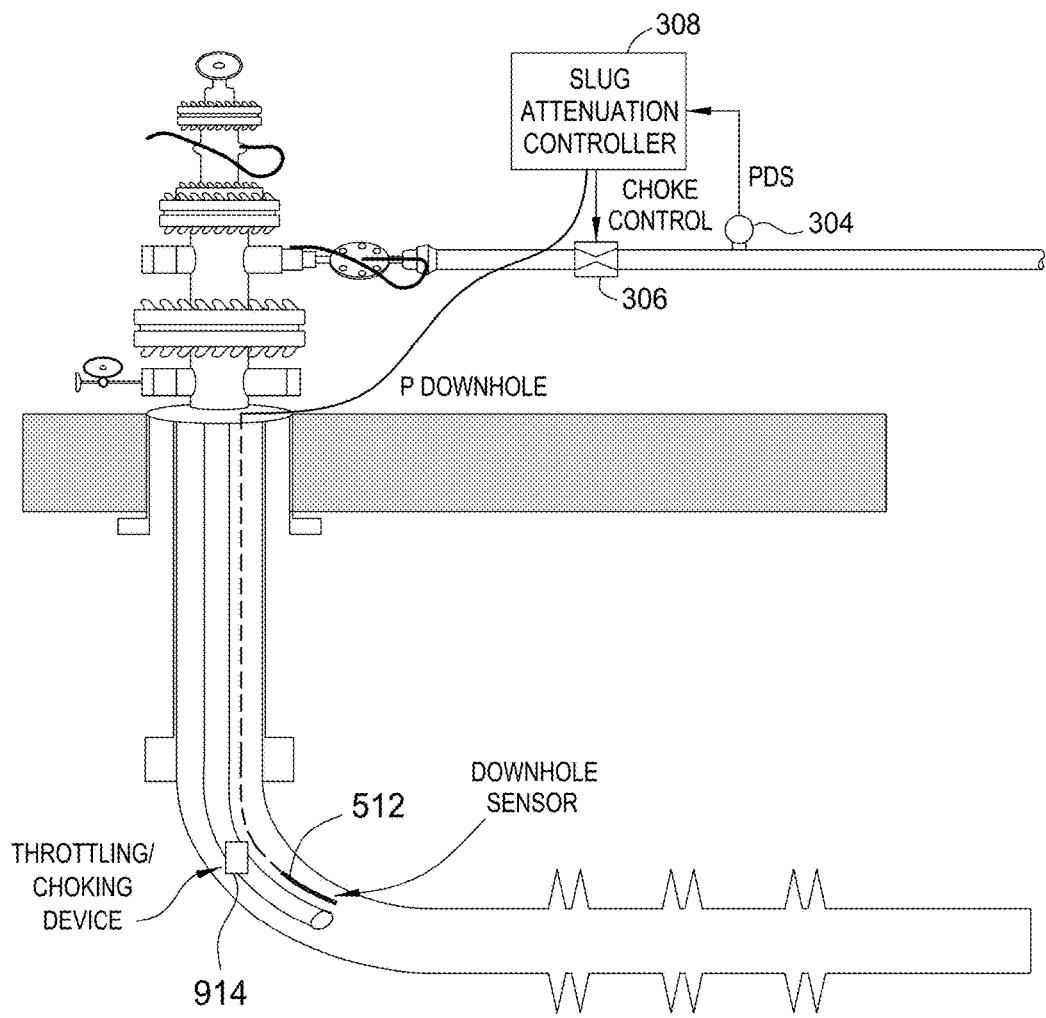
FIG. 9 illustrates an example well configuration with a downhole throttling and/or choking device for attenuating the effects of slug flow, in accordance with certain aspects of the present disclosure.
Figure 10:
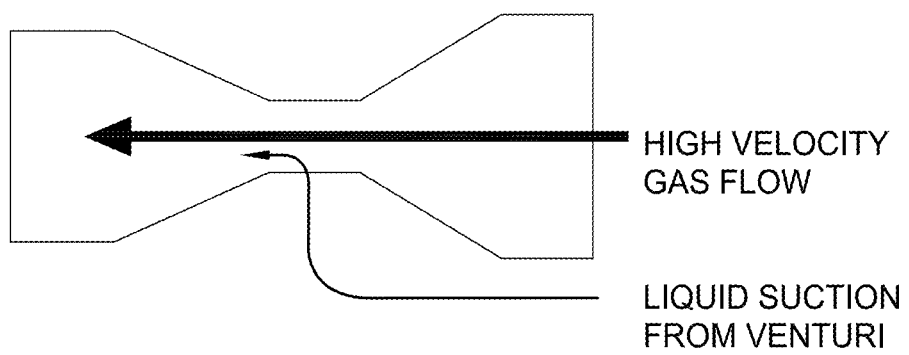
FIG. 10 illustrates an example Venturi tube for attenuating the effects of slugging, in accordance with certain aspects of the present disclosure.

For example, as illustrated in FIG. 9, the one or more wells may comprise a downhole throttling and/or choking device 914 that is remotely controlled by the controller. The downhole device 914 may be used to supplement a surface choke 306 or in case the surface choke 306 is not effective (e.g., due to capacitance of the tubing). In addition to a remote control valve, autonomous devices may also be implemented such as a valve throttling based on velocity, or a torturous path through which fluids must pass and in which vibrations and slugs are attenuated. According to certain aspects, these devices may be tunable by the controller 308. In some cases, a Venturi tube may also be used to help avoid slugging by attempting to promote the mixing of fluids with a high velocity gas flow. For example, as illustrated in FIG. 10, high velocity gas flowing through a Venturi tube 1002 can create suction and displace liquids located in low spots where presence of liquids may be likely (which might otherwise lead to slugging).

In some cases, choke control may be performed on a plurality of wells that, for example, may share a common skid or feed into a same header. In such cases, a controller may act as a central controller managing slug flow for the multiple wells.

Figure 11:
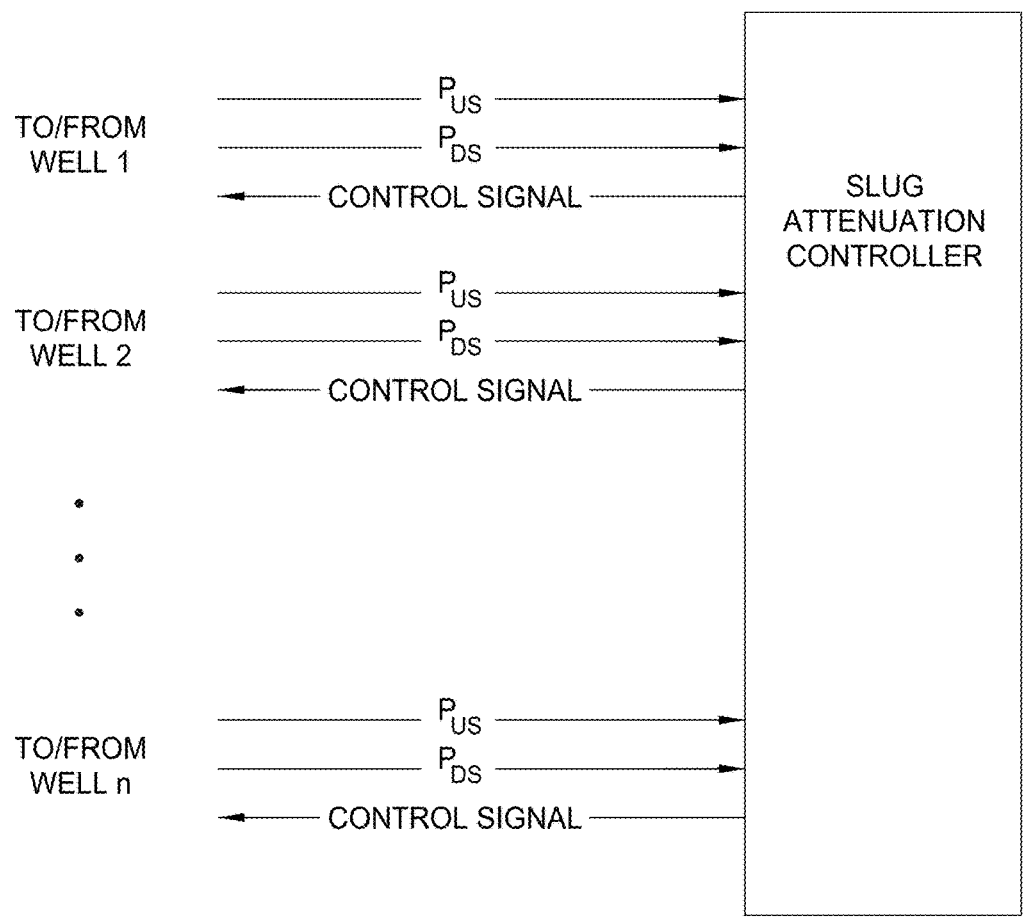
FIG. 11 is a block diagram of a central control system for managing the effects of slugging in a plurality of wells, in accordance with certain aspects of the present disclosure.

Such central control is illustrated in FIG. 11, in which the controller 308 may receive upstream and downstream parameters ($P_{US}$ and $P_{DS}$) from sensors in a plurality of wells (e.g., wells 1 to n of FIG. 11). Based on the inputs, a single controller (e.g., controller 308) can manage the effects of slugging in the plurality of wells. For example, the controller may manage fluid flow from a first plurality of wells based on characteristics of fluid flow from a second plurality of wells.

In a configuration where a group of wells are feeding a single header, controlling multiple wells concurrently may be more effective than controlling slugs on an individual well basis. Thus, feedback from an individual well may be fed back to a master control program, which may be operated in the controller 308. This information may be used to modify control of other wells in the group.

With the ability to control multiple wells, the controller 308 may smooth the aggregate flow to the header by modifying control of a first well or group of wells to minimize the effects of slugging in a second well or group of wells. For example, the controller may determine (e.g., based on the periodicity of slugging) periods of time during which slug flow occurs and periods of time during which liquid flow occurs in each of the wells in the group. This information may be used to control slugging in the group of wells such that a period of relatively high gas flow at the header from a first wellbore does not overlap with a period of relatively high liquid flow from a second wellbore. For example, slug flow in one well may be slowed down by the controller 308 (e.g., by controlling an artificial lift) such that the slug flow from a first well passes through the header (or other equipment) at a time during which liquid flow passes from another well (or multiple other wells). This method may help smooth out the aggregate slug flow to the header and as a result, attenuate the effects of slugging.

While examples provided herein have described controlling a choke 306 to manage slugs in a fluid flow of a well to facilitate understanding, persons of ordinary skill will appreciate that techniques described herein can be applied to any device configured to manage the fluid flow (e.g., alter a parameter of the fluid flow). For example, pulsation attenuation and/or dampening systems may be used to manage slugs based on the one or more sensed parameters. In certain aspects, the pulsation attenuation and/or dampening systems may be added near the well, pad, or gathering station, which may allow for slug control without pressure losses that may otherwise be present if using a choking mechanism. In certain aspects, the operating rate of an artificial lift system can be adjusted to impact slug transmission to the surface. In certain aspects, slugs may be managed by controlling multiple devices, such as the choke 306 in addition to an artificial lift system and/or another choke that may be located at the surface or downhole.

The techniques presented herein have been described with reference to horizontal wellbore applications as a particular, but not limiting, application example. Those skilled in the art, however, will recognize that the techniques may be more broadly applied to any type of system with fluid flow in which slugging may occur in the fluid flow.

Any of the operations described above, such as the operations 400, may be included as instructions in a computer-readable medium for execution by the controller 308. The computer-readable medium may comprise any suitable memory or other storage device for storing instructions, such as read-only memory (ROM), random access memory (RAM), flash memory, an electrically erasable programmable ROM (EEPROM), a compact disc ROM (CD-ROM), or a floppy disk.

While the foregoing is directed to embodiments of the present invention, other and further embodiments of the invention may be devised without departing from the basic scope thereof, and the scope thereof is determined by the claims that follow.

The invention claimed is:

1. A method for managing slugs in a fluid flow produced from at least one wellbore, comprising:
    sensing downhole at least one first parameter of the fluid flow in the wellbore;
    sensing at least one second parameter of the fluid flow, wherein the at least one first parameter is sensed upstream from a configurable choke located above a surface of the wellbore and wherein the at least one second parameter is sensed downstream from the configurable choke, upstream and downstream being relative to a direction of the fluid flow; and
    taking one or more actions by a controller to manage the fluid flow based on the at least one first parameter and the at least the second parameter indicating a presence of a slug of gas or a slug of liquid in the fluid flow.

2. The method of claim 1, wherein at least one of the at least one first parameter or the at least one second parameter comprises a plurality of parameters.

3. The method of claim 1, further comprising:
    sensing at least a third parameter of the fluid flow at the surface of the wellbore and upstream from the configurable choke, wherein taking the one or more actions is further based on the third parameter.

4. The method of claim 1, wherein taking one or more actions comprises controlling one or more devices configured to manage the fluid flow.

5. The method of claim 1, wherein taking one or more actions comprises controlling one or more devices located downhole to manage the fluid flow.

6. The method of claim 5, wherein the one or more devices comprise another choke located downhole, a valve located downhole, or one or more devices that are tunable to alter a parameter of the fluid flow downhole.

7. The method of claim 1, wherein taking one or more actions comprises controlling artificial lift in the wellbore.

8. The method of claim 7, wherein controlling artificial lift in the wellbore comprises at least one of: controlling a valve that provides gas for artificial lift, controlling an electrically submersible pump (ESP), or controlling a pump rate.

9. The method of claim 1, wherein:
    the at least one wellbore comprises a plurality of wellbores;
    the sensing comprises sensing, for each of the plurality of wellbores, the at least one first parameter of the fluid flow downhole in the wellbore and the at least one second parameter of the fluid flow at the surface of the wellbore; and
    taking one or more actions comprises taking one or more actions to manage the fluid flow, in each of the plurality of wellbores, if the first and second parameters indicate the presence of the slug of gas or the slug of liquid in the fluid flow.

10. The method of claim 9, wherein taking one or more actions comprises:
    taking one or more actions to manage the fluid flow from at least a first wellbore of the plurality of wellbores, based on characteristics of fluid flow from at least a second wellbore of the plurality of wellbores.

11. The method of claim 10, wherein fluid flows from the plurality of wellbores feed into a common header, and wherein taking one or more actions to manage the fluid flow in the first wellbore of the plurality of wellbores, based on characteristics of fluid flow in the second wellbore of the plurality of wellbores comprises:
    taking action to attempt to align, at the header, a period of relatively high gas fluid flow from the first wellbore with a period of relatively high liquid flow from the second wellbore.

12. The method of claim 1, wherein taking one or more actions comprises diverting the fluid flow to an alternate flow path.

13. An apparatus for managing slugs in a fluid flow produced from at least one wellbore, comprising:
    a processing system configured to:
        sense downhole at least one first parameter of the fluid flow in the wellbore;
        sense at least one second parameter of the fluid flow, wherein the at least one first parameter is sensed upstream from a configurable choke located above a surface of the wellbore and wherein the at least one second parameter is sensed downstream from the configurable choke, upstream and downstream being relative to a direction of the fluid flow; and
        take one or more actions to manage the fluid flow, based on the at least one first parameter and the at least one second parameter indicating a presence of a slug of gas or a slug of liquid in the fluid flow.

14. The apparatus of claim 13, wherein the processing system is further configured to:
    sense at least a third parameter of the fluid flow at the surface of the wellbore and upstream from the configurable choke, wherein the processing system is configured to take the one or more actions further based on the third parameter.

15. The apparatus of claim 13, wherein taking one or more actions comprises controlling one or more devices configured to manage the fluid flow.

16. The apparatus of claim 13, wherein taking one or more actions comprises controlling one or more devices located downhole to manage the fluid flow.

17. The apparatus of claim 16, wherein the one or more devices comprise another choke located downhole, a valve located downhole, or one or more devices that are tunable to alter a parameter of the fluid flow downhole.

18. The apparatus of claim 13, wherein taking one or more actions comprises controlling artificial lift in the wellbore.

19. The apparatus of claim 13, wherein:
    the at least one wellbore comprises a plurality of wellbores;
    the sensing comprises sensing, for each of the plurality of wellbores, the at least one first parameter of the fluid flow downhole in the wellbore and the at least one second parameter of the fluid flow at the surface of the wellbore; and
    taking one or more actions comprises taking one or more actions to manage the fluid flow, in each of the plurality of wellbores, if the first and second parameters indicate the presence of the slug of gas or the slug of liquid in the fluid flow.

20. The apparatus of claim 19, wherein taking one or more actions comprises:
    taking one or more actions to manage the fluid flow from at least a first wellbore of the plurality of wellbores, based on characteristics of the fluid flow from at least a second wellbore of the plurality of wellbores.

21. The apparatus of claim 20, wherein fluid flows from the plurality of wellbores feed into a common header, and wherein taking one or more actions to manage the fluid flow in the first wellbore of the plurality of wellbores, based on characteristics of fluid flow in the second wellbore of the plurality of wellbores comprises:
taking action to attempt to align, at the header, a period of relatively high gas fluid flow from the first wellbore with a period of relatively high liquid flow from the second wellbore.

22. A computer-readable medium comprising instructions for managing slugs in a fluid flow produced from at least one wellbore, wherein the instructions, when executed, cause an apparatus to:
sense downhole at least one first parameter of the fluid flow in the wellbore;
sense at least one second parameter of the fluid flow, wherein the at least one first parameter is sensed upstream from a configurable choke located above a surface of the wellbore and wherein the at least one second parameter is sensed downstream from the configurable choke, upstream and downstream being relative to a direction of the fluid flow; and
take one or more actions to manage the fluid flow, based on the at least one first parameter and the at least one second parameter indicating a presence of a slug of gas or a slug of liquid in the fluid flow.

23. The computer-readable medium of claim 22, wherein the instructions cause the apparatus to:
sense at least a third parameter of the fluid flow at the surface of the wellbore and upstream from the configurable choke, wherein the instructions cause the apparatus to take the one or more actions further based on the third parameter.

24. The computer-readable medium of claim 22, wherein taking one or more actions comprises controlling one or more devices configured to manage the fluid flow.

25. The computer-readable medium of claim 22, wherein taking one or more actions comprises controlling one or more devices located downhole to manage the fluid flow.

26. The computer-readable medium of claim 25, wherein the one or more devices comprise another choke located downhole, a valve located downhole, or one or more devices that are tunable to alter a parameter of the fluid flow downhole.

27. The computer-readable medium of claim 22, wherein taking one or more actions comprises controlling artificial lift in the wellbore.

28. The computer-readable medium of claim 22, wherein:
the at least one wellbore comprises a plurality of wellbores;
the sensing comprises sensing, for each of the plurality of wellbores, the at least one first parameter of the fluid flow downhole in the wellbore and the at least one second parameter of the fluid flow at the surface of the wellbore; and
taking one or more actions comprises taking one or more actions to manage the fluid flow, in each of the plurality of wellbores, if the first and second parameters indicate the presence of the slug of gas or the slug of liquid in the fluid flow.

29. The computer-readable medium of claim 28, wherein taking one or more actions comprises:
taking one or more actions to manage the fluid flow from at least a first wellbore of the plurality of wellbores, based on characteristics of fluid flow from at least a second wellbore of the plurality of wellbores.

30. The computer-readable medium of claim 29, wherein fluid flows from the plurality of wellbores feed into a common header, and wherein taking one or more actions to manage the fluid flow in the first wellbore of the plurality of wellbores, based on characteristics of fluid flow in the second wellbore of the plurality of wellbores comprises:
taking action to attempt to align, at the header, a period of relatively high gas fluid flow from the first wellbore with a period of relatively high liquid flow from the second wellbore.

31. The method of claim 1, wherein the at least one first parameter is sensed upstream from another choke located downhole in the wellbore.

32. The method of claim 1, wherein taking the one or more actions comprises controlling the configurable choke based on the indication.

* * * * *